(12) United States Patent
Nakagawa et al.

(10) Patent No.: US 9,991,574 B2
(45) Date of Patent: Jun. 5, 2018

(54) ONBOARD BATTERY FOR VEHICLE

(71) Applicant: FUJI JUKOGYO KABUSHIKI KAISHA, Tokyo (JP)

(72) Inventors: Isao Nakagawa, Tokyo (JP); Toshiyuki Hara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 82 days.

(21) Appl. No.: 14/991,993

(22) Filed: Jan. 10, 2016

(65) Prior Publication Data

US 2016/0211561 A1 Jul. 21, 2016

(30) Foreign Application Priority Data

Jan. 16, 2015 (JP) .................................. 2015-006908

(51) Int. Cl.
*H02J 7/00* (2006.01)
*H02J 7/14* (2006.01)
*H01M 10/6566* (2014.01)
*H01M 10/613* (2014.01)
*H01M 10/625* (2014.01)
*H01M 10/46* (2006.01)
*B60L 11/18* (2006.01)
*H01M 2/10* (2006.01)
*H01M 10/6563* (2014.01)
(Continued)

(52) U.S. Cl.
CPC ......... *H01M 10/6566* (2015.04); *B60L 11/18* (2013.01); *H01M 2/1077* (2013.01); *H01M 10/46* (2013.01); *H01M 10/613* (2015.04); *H01M 10/625* (2015.04); *H01M 10/6557* (2015.04); *H01M 10/6563* (2015.04); *H01M 10/647* (2015.04); *H01M 2220/20* (2013.01)

(58) Field of Classification Search
CPC .... H05J 7/0042; H05J 7/0052; H05K 1/0201; H05K 1/0272; H05K 7/20145; H05K 2201/064
USPC .................................. 320/107, 112–115, 104
See application file for complete search history.

(56) References Cited

U.S. PATENT DOCUMENTS 6,066,938 A * 5/2000 Hyodo .................. H02J 7/0042
320/114
2002/0195996 A1* 12/2002 Nakatsuji ............ F02N 11/0866
320/117

(Continued)

FOREIGN PATENT DOCUMENTS

JP 2012-081879 A 4/2012
JP 5206110 B 6/2013
JP 2013-168318 A 8/2013

*Primary Examiner* — David V Henze-Gongola
(74) *Attorney, Agent, or Firm* — Chip Law Group

(57) ABSTRACT

An onboard battery for a vehicle includes battery modules each including battery cells, an auxiliary device for charging, and a housing case housing the battery modules and auxiliary device. Cooling air is taken from air intake holes into the battery modules to cool the battery cells. A middle of a transversal direction of the battery modules is shifted to either left or right of a center of a transversal direction of a vehicle. The auxiliary device is disposed at an other end portion in the transversal direction. Each air intake hole is between a left and right end of each battery module and in a back of each battery module. A side opposite to a side of the auxiliary device has an air introducing port 55a that takes cooling air into the housing case.

7 Claims, 16 Drawing Sheets

(51) Int. Cl.
*H01M 10/6557* (2014.01)
*H01M 10/647* (2014.01)

(56) References Cited

U.S. PATENT DOCUMENTS

| | | | | |
|---|---|---|---|---|
| 2005/0121979 A1* | 6/2005 | Matsumoto | ......... | H01M 10/441 307/66 |
| 2015/0357692 A1* | 12/2015 | Piggott | ............ | H01M 10/6572 320/107 |

* cited by examiner

ONBOARD BATTERY FOR VEHICLE

CROSS-REFERENCE TO RELATED APPLICATIONS

The present application claims priority from Japanese Patent Application No. 2015-006908 filed on Jan. 16, 2015, the entire contents of which are hereby incorporated by reference.

BACKGROUND

1. Technical Field

The present disclosure relates to the technical field of onboard batteries that are installed in vehicles, such as automobiles, and can be used even in cold areas.

2. Related Art

Onboard batteries are installed in various vehicles, such as automobiles, in order to supply electric power to motors and other various electrical components.

In recent years, in particular, vehicles such as electric vehicles (EV), hybrid electric vehicles (HEV), and plug-in hybrid electric vehicles (PHEV) have gained widespread use. In these electricity-driven vehicles, onboard batteries having a high electricity-storage function are installed.

An onboard battery includes a housing case and a battery module housed in the housing case. The battery module is configured by, for example, arranging a plurality of battery cells (secondary batteries), such as nickel hydrogen batteries or lithium ion batteries. In an onboard battery to be installed in an electric vehicle or the like, in order to retain a high electricity-storage function, a plurality of battery modules are disposed in the housing case and battery cells in each of the battery modules are connected in series or in parallel.

An example of an onboard battery is a type in which the plurality of battery modules are disposed in the housing case as a structure for retaining a high electricity-storage function (see Japanese Patent No. 5206110).

In such an onboard battery, inside the housing case are disposed, in addition to the plurality of battery modules, various devices including a control device that controls these battery modules and an auxiliary device for charging in a non-running state of the vehicle, such as nighttime.

As described above, the onboard battery has, in addition to the plurality of battery modules, various devices including the control device and the auxiliary device disposed therein, and thus, the internal temperature of the housing case may be easily increased by heat generated when the battery modules or devices are driven.

Therefore, in order to secure normal operation of the battery modules or devices, the increase in the internal temperature of the housing case needs to be suppressed. The above-described onboard battery, in which the plurality of battery modules are disposed, generates an especially large amount of heat. Therefore, it is desirable to increase a cooling performance of cooling the components disposed inside the housing case.

SUMMARY OF THE INVENTION

Therefore, an object of the present disclosure is to increase the cooling performance of cooling the components disposed inside the housing case.

An onboard battery for a vehicle according to an aspect of the present disclosure is an onboard battery for a vehicle including: battery modules each including battery cells disposed therein; an auxiliary device for charging; and a housing case that houses the battery modules and the auxiliary device. Cooling air is taken from respective air intake holes into the battery modules to cool the battery cells. A middle of a transversal direction of the battery modules is located to be shifted to either one of left and right of a center of a transversal direction of the vehicle. The auxiliary device is disposed at an other end portion in the transversal direction of the battery modules. Each of the air intake holes is located between a left end and a right end of each of the battery modules and in a back of each of the battery modules. A side opposite to a side on which the auxiliary device is disposed, with reference to a center of a transversal direction, has an air introducing port that takes cooling air into the housing case from a front side.

The housing case may include a control device disposed therein, the control device controlling the battery modules, a conductive line connected to the control device may be disposed by being inserted into a protective pipe, and an end of the protective pipe may have an opening as the air introducing port.

The cooling air that has been taken in from the air intake holes may be ejected into a front end portion inside the housing case, and the control device may be disposed at the front end portion inside the housing case.

The housing case may include a partition therein, the partition partitioning the control device and the auxiliary device, and the partition may have a communication hole that communicates with a space including the control device and a space including the auxiliary device.

DETAILED DESCRIPTION

Figure 1:
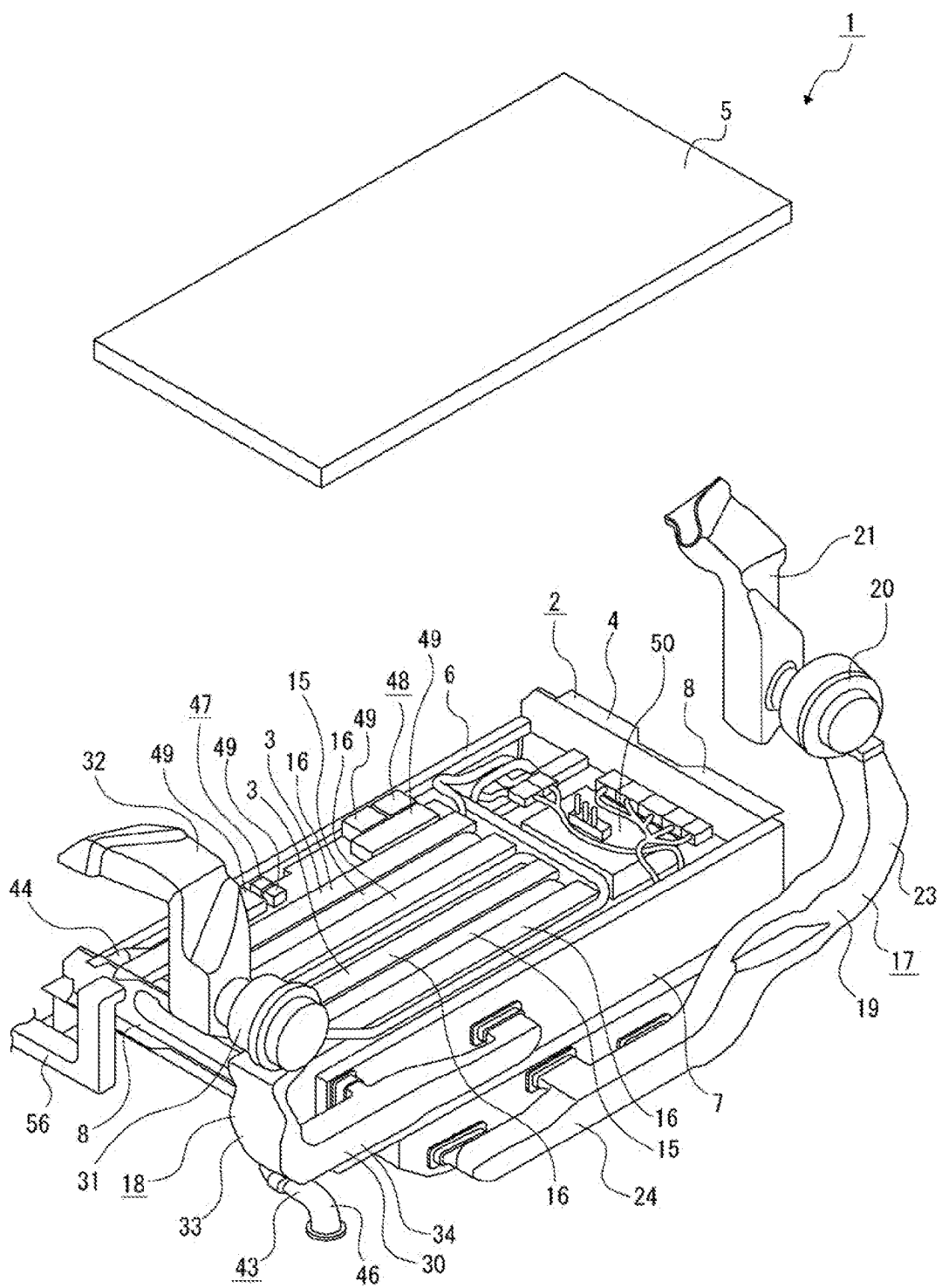
FIG. 1 illustrates an implementation of an onboard battery according to the present disclosure together with FIGS. 2 to 16, and is a perspective view of the onboard battery.

Hereinafter, a preferred implementation of the present disclosure will be described in detail with reference to the appended drawings. Note that, in this specification and the appended drawings, structural elements that have substantially the same function and structure are denoted with the same reference numerals, and repeated explanation of these structural elements is omitted.

An implementation of an onboard battery of the present disclosure will be described below with reference to the appended drawings.

Figure 2:
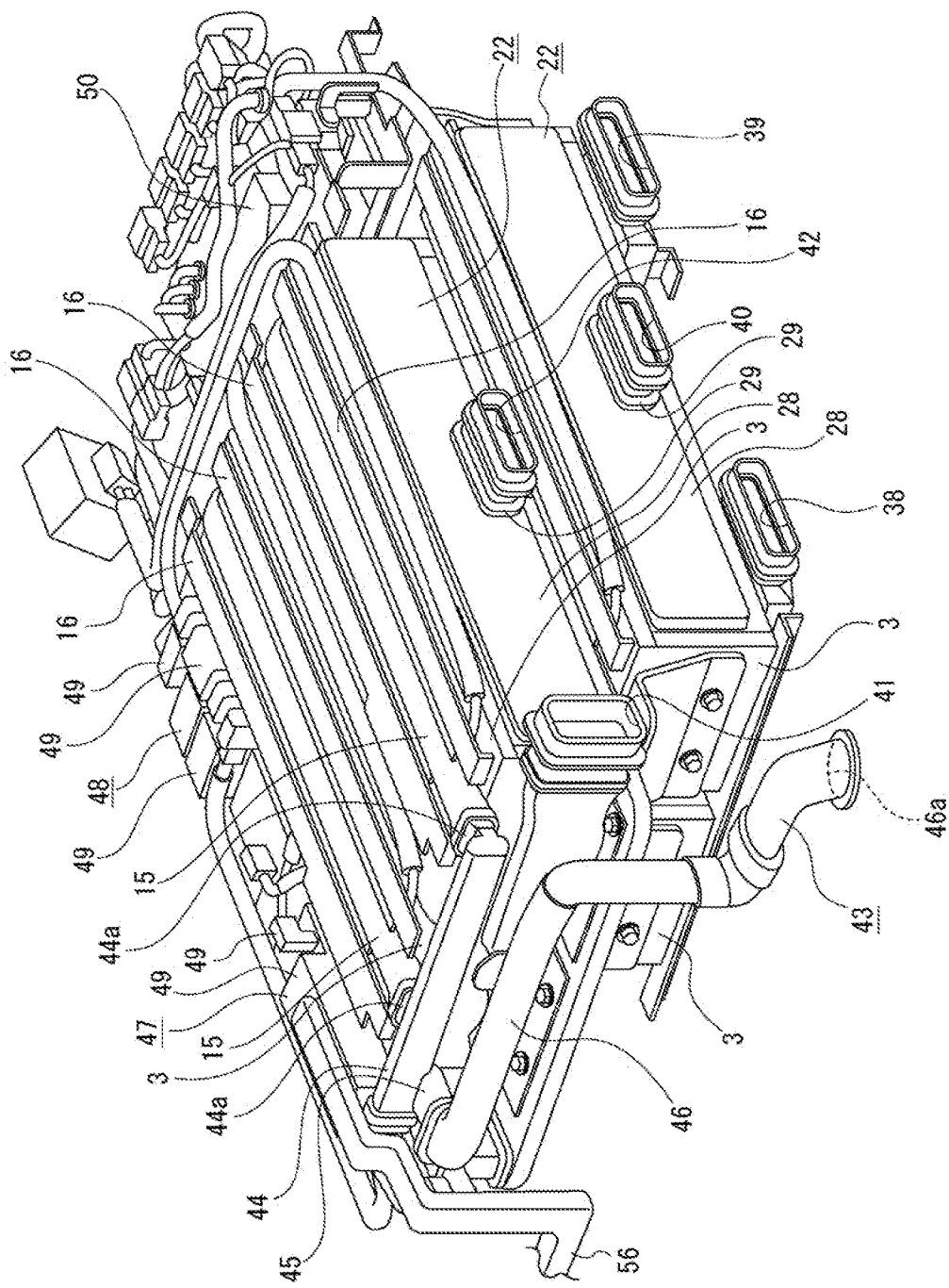
FIG. 2 is a perspective view of the onboard battery by omitting a part thereof.
Figure 3:
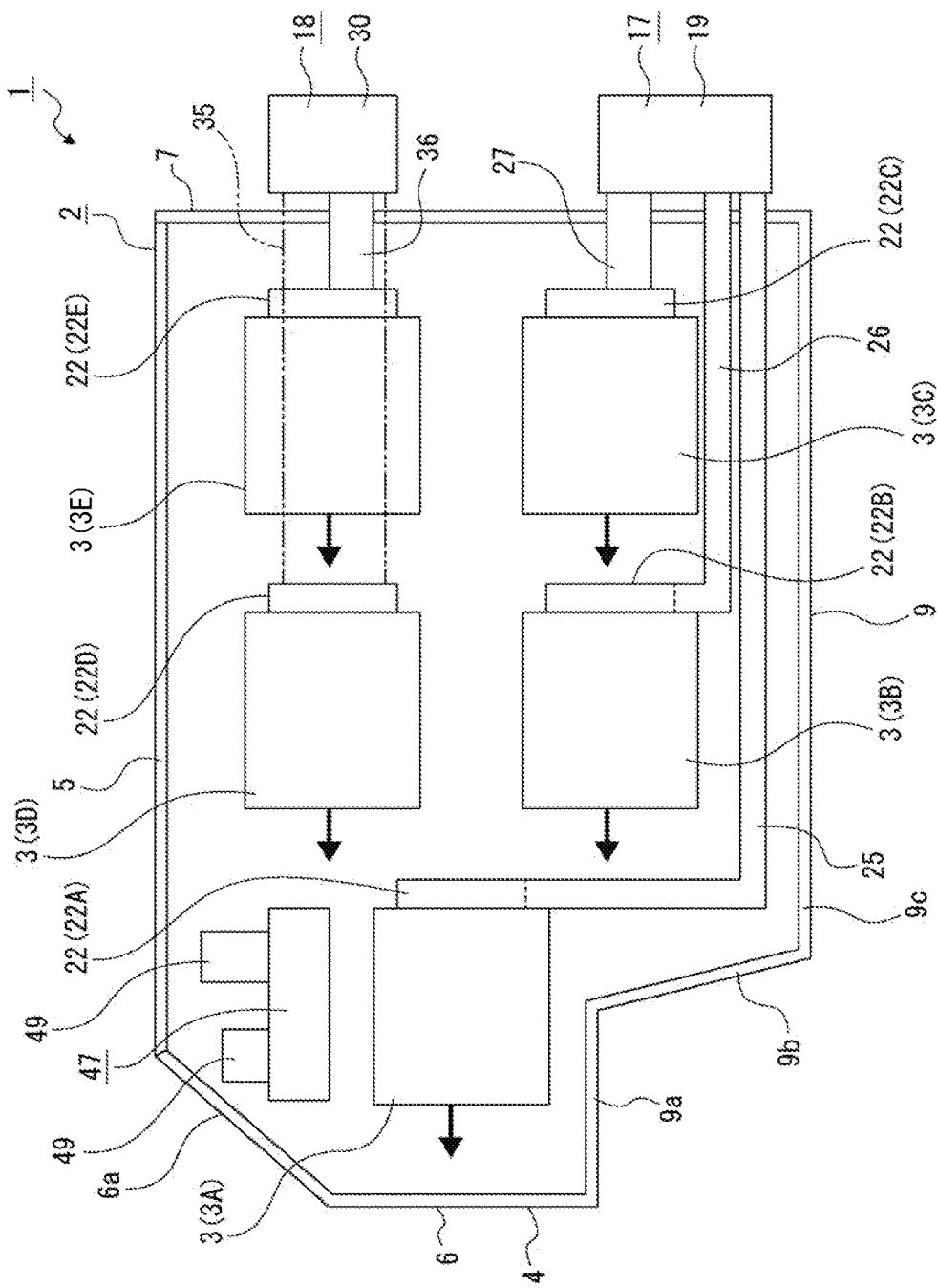
FIG. 3 is a schematic diagram illustrating a state or the like of disposition of battery modules in the onboard battery.

An onboard battery 1 includes a housing case 2 and battery modules 3 (see FIGS. 1 to 3). The onboard battery 1 is disposed in a trunk of a vehicle, for example.

The housing case 2 includes a housing part 4 and a lid part 5, the housing part 4 having an upward opening, the lid part 5 having a shape like a plate to seal the opening of the housing part 4 from the above.

The housing part 4 includes a front wall 6, a rear wall 7, two side walls 8, and a bottom wall 9. The front wall 6 faces the longitudinal direction, the rear wall 7 is located behind the front wall 6 and faces the longitudinal direction, the side walls 8 are located in spaced relation with each other in the transversal direction, and the bottom wall 9 faces the vertical direction. Each of the front wall 6, the rear wall 7, the side walls 8, and the bottom wall 9 is formed through extrusion of aluminum, for example, and has a hollow section.

Although not illustrated, for example, a plurality of hollows extending from side to side and arranged in the vertical direction are formed in each of the front wall 6 and the rear wall 7; a plurality of hollows extending in the longitudinal direction and arranged in the vertical direction are formed in each of the side walls 8; and a plurality of hollows extending from side to side and arranged in the longitudinal direction are formed in the bottom wall 9.

Almost an upper half part of the front wall 6 is an inclining part 6a that inclines so as to undergo displacement rearward as going upward.

The bottom wall 9 has a front end portion as an upper-stage part 9a that is higher than other parts of the bottom wall 9 by one level (see FIG. 3). The bottom wall 9 has a rear part as a lower-stage part 9c, and a bridging portion between the upper-stage part 9a and the lower-stage part 9c is a stepping part 9b facing substantially the longitudinal direction.

For example, five battery modules 3 are arranged in the longitudinal and vertical directions and are housed in the housing case 2. The battery modules 3 include a first battery module 3A located at the forefront, a second battery module 3B located behind the first battery module 3A, a third battery module 3C located behind the second battery module 3B, a fourth battery module 3D located behind the first battery module 3A and directly above the second battery module 3B, and a fifth battery module 3E located behind the fourth battery module 3D and directly above the third battery module 3C.

The first battery module 3A, the second battery module 3B, the third battery module 3C, the fourth battery module 3D, and the fifth battery module 3E are connected in series via electric wiring.

Figure 4:
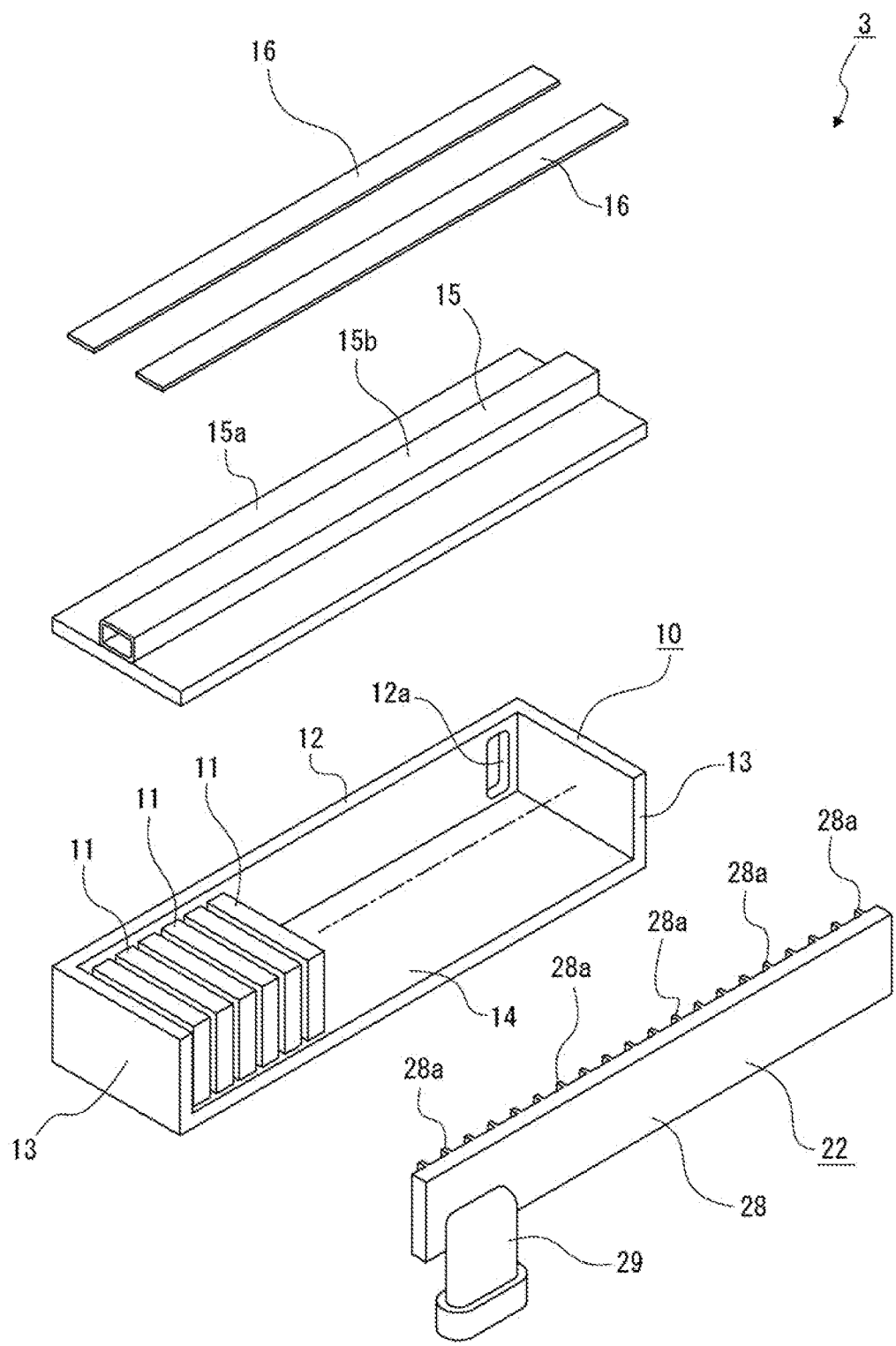
FIG. 4 is a schematic disassembled perspective view of a battery module and a joint duct.

Each of the battery modules 3 includes a case body 10 and a plurality of battery cells 11 housed inside the case body 10 (see FIG. 4).

The case body 10 has a shape of a rectangular box having upward and rearward openings. The case body 10 includes a wide front surface part 12, two side surface parts 13, and a wide bottom surface part 14. The front surface part 12 faces the longitudinal direction, the side surface parts 13 face the transversal direction and are located in spaced relation with each other in the transversal direction, and the bottom surface part 14 faces the vertical direction. The internal space of the case body 10 serves as a space for housing.

The front surface part 12 has an ejection hole 12a penetrating through the front surface part 12 in the longitudinal direction at any of a right end portion, a left end portion, and a center portion in the transversal direction. Specifically, the first battery module 3A has the ejection hole 12a at the right end portion of the front surface part 12, the second battery module 3B has the ejection hole 12a at the left end portion of the front surface part 12, the third battery module 3C has the ejection hole 12a at the center portion of the front surface part 12 in the transversal direction, the fourth battery module 3D has the ejection hole 12a at the right end portion of the front surface part 12, and the fifth battery module 3E has the ejection hole 12a at the center portion of the front surface part 12 in the transversal direction. FIG. 4 illustrates an example in which the ejection hole 12a is formed at the right end portion of the front surface part 12.

The battery cells 11 are, for example, arranged from side to side at regular intervals in a manner that the thickness direction of the battery cell corresponds to the transversal direction and housed in the space for housing to be held in the case body 10. For example, 19 battery cells 11 are held in the case body 10. In the state in which the battery cells 11 are held in the case body 10, constant spaces are formed between each adjacent battery cells 11. In addition, the battery cells 11 are connected in series.

The case body 10 is equipped with a gas-exhaust pipe 15 extending in the transversal direction. The gas-exhaust pipe 15 includes a base plate part 15a facing the vertical direction and a tubular part 15b located on the top surface of the base plate part 15a. The tubular part 15b is located at a center portion of the base plate part 15a in the longitudinal direction. The gas-exhaust pipe 15 is attached to the case body 10 in a manner that the base plate part 15a seals the upward opening of the case body 10.

Although not illustrated, gas-flowing holes are arranged from side to side at regular intervals on the lower surface of the gas-exhaust pipe 15. The gas-flowing holes of the gas-exhaust pipe 15 are located directly above the respective battery cells 11.

Two wide plates 16 are attached to both end portions of the base plate part 15a of the gas-exhaust pipe 15 in the longitudinal direction. Each of the plates 16 is connected to later-described electric wiring so that the battery cells 11 can be electrically controlled via the electric wiring and the plates 16, for example.

Although not illustrated, each of the battery cells 11 includes therein a valve that is capable of communication. Each valve communicates with the corresponding one of the gas-flowing holes of the gas-exhaust pipe 15. In case malfunction occurs, gas might be generated inside a battery cell 11. However, the generation of gas increases the internal pressure of the battery cell 11 to open the valve, and the generated gas flows through the valve and the gas-flowing hole to the gas-exhaust pipe 15.

Although not illustrated, each of the battery modules 3 is mounted on the housing case 2 by a mounting plate and disposed at a predetermined position (see FIG. 3). The second battery module 3B and the third battery module 3C are disposed in the lower stage, the fourth battery module 3D and the fifth battery module 3E are disposed in the upper stage, and the first battery module 3A is disposed in the middle stage with respect to the second battery module 3B, the third battery module 3C, the fourth battery module 3D, and the fifth battery module 3E. Note that the first battery module 3A may be disposed in the lower stage as well as the second battery module 3B and the third battery module 3C, or may be disposed in the upper stage as well as the fourth battery module 3D and the fifth battery module 3E.

In driving the battery modules 3, cooling air is taken into the battery modules 3 from a first intake unit 17 and a second intake unit 18 (see FIGS. 1, 3, 5, and 6).

Figure 5:
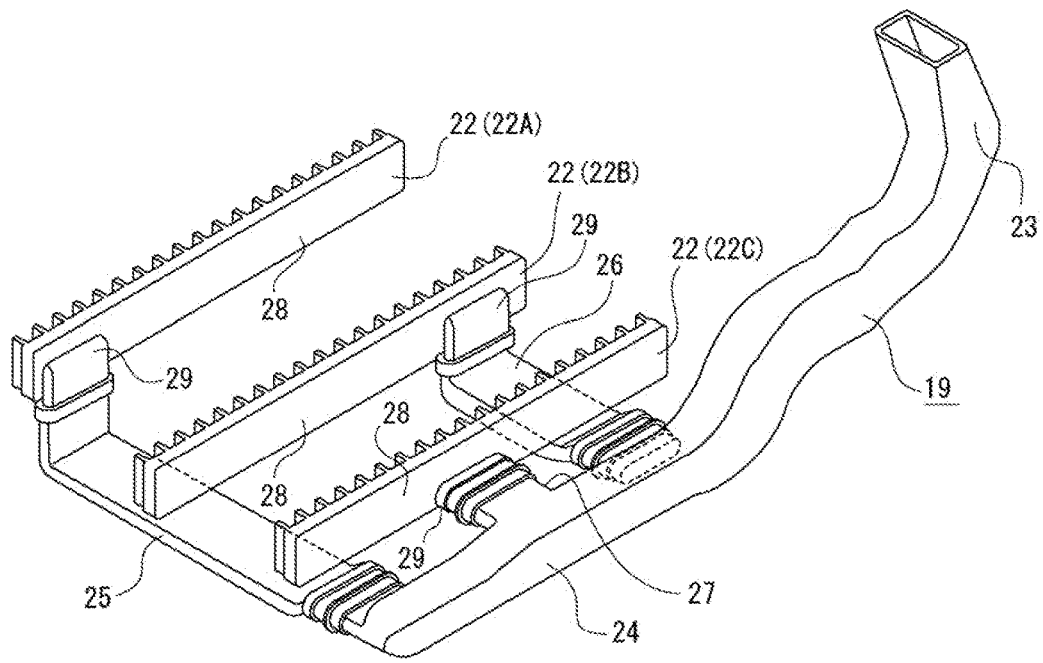
FIG. 5 is a perspective view of a first intake unit.

The first intake unit 17 includes a first intake duct 19, a first intake fan 20, a first intake pipe 21, and three joint ducts 22 (see FIGS. 1 and 5).

The first intake duct 19 takes the cooling air into the first battery module 3A, the second battery module 3B, and the third battery module 3C. The first intake duct 19 includes an intake part 23, an intermediate part 24, a first inflow part 25, a second inflow part 26, and a third inflow part 27.

The intake part 23 is located on the right side and substantially has a shape of V. Almost a half of the intake part 23 extends in a substantially vertical direction, and the other half thereof extends in a substantially transversal direction. The intermediate part 24 extends in the transversal direction, and a right end portion thereof continues to a left end portion of the intake part 23.

A front end portion of the first inflow part 25 is bent upward with respect to other portions of the first inflow part 25 that extend in the longitudinal direction. In addition, a rear end portion of the first inflow part 25 continues to a left end portion of the intermediate part 24. A front end portion of the second inflow part 26 is bent upward with respect to other portions of the second inflow part 26 that extend in the longitudinal direction. In addition, a rear end portion of the second inflow part 26 continues to the right end portion of the intermediate part 24. The third inflow part 27 extends in the longitudinal direction, and a rear end portion of the third inflow part 27 continues to a substantial center portion of the intermediate part 24 in the transversal direction. The lengths of the first inflow part 25, the second inflow part 26, and the third inflow part 27 in the longitudinal direction descend in this order.

The first intake fan 20 is linked to a top end portion of the intake part 23.

A lower end portion of the first intake pipe 21 is linked to the first intake fan 20. Therefore, when the first intake fan 20 rotates, the cooling air is taken in from the first intake pipe 21 and flows toward the first intake duct 19.

The joint ducts 22 consist of a first joint duct 22A, a second joint duct 22B, and a third joint duct 22C. The first joint duct 22A takes the cooling air into the first battery module 3A, the second joint duct 22B takes the cooling air into the second battery module 3B, and the third joint duct 22C takes the cooling air into the third battery module 3C. The first joint duct 22A, the second joint duct 22B, and the third joint duct 22C are located in this order from the front.

Each of the joint ducts 22 includes a main body part 28 and a linking part 29. The main body part 28 has a wide substantially rectangular shape, and the linking part 29 projects from the main body part 28. The joint duct 22 has a space therein. The main body part 28 includes discharging projections 28a that project ahead and are spaced at regular intervals in the transversal direction. Each of the discharging projections 28a has an opening at a tip.

The linking part 29 of the first joint duct 22A projects downward from a left end portion of the main body part 28, the linking part 29 of the second joint duct 22B projects downward from a right end portion of the main body part 28, and the linking part 29 of the third joint duct 22C projects rearward from a center portion of the main body part 28 in the transversal direction.

Figure 6:
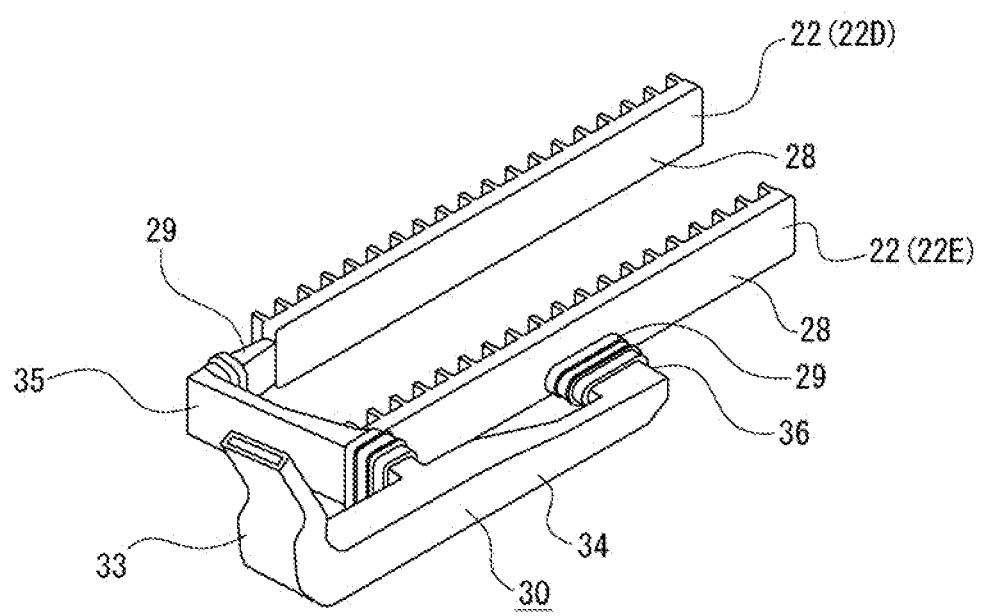
FIG. 6 is a perspective view of a second intake unit.

The second intake unit 18 includes a second intake duct 30, a second intake fan 31, a second intake pipe 32, and two joint ducts 22 (see FIGS. 1 and 6).

The second intake duct 30 takes the cooling air into the fourth battery module 3D and the fifth battery module 3E. The second intake duct 30 includes an intake part 33, an intermediate part 34, a fourth inflow part 35, and a fifth inflow part 36.

The intake part 33 is located on the left side and substantially has a shape of V. Almost a half of the intake part 33 extends in a substantially vertical direction, and the other half thereof extends in a substantially transversal direction. The intermediate part 34 extends in the transversal direction, and a left end portion thereof continues to a right end portion of the intake part 33.

A front end portion of the fourth inflow part 35 is bent rightward with respect to other portions of the fourth inflow part 35 that extend in the longitudinal direction. In addition, a rear end portion of the fourth inflow part 35 continues to the left end portion of the intermediate part 34. The fifth inflow part 36 extends in the longitudinal direction, and a rear end portion of the fifth inflow part 36 continues to a right end portion of the intermediate part 34. The length of the fourth inflow part 35 is longer than the length of the fifth inflow part 36 in the longitudinal direction.

The second intake fan 31 is linked to a top end portion of the intake part 33.

A lower end portion of the second intake pipe 32 is linked to the second intake fan 31. Therefore, when the second intake fan 31 rotates, the cooling air is taken in from the second intake pipe 32 and flows toward the second intake duct 30.

The joint ducts 22 consist of a fourth joint duct 22D and a fifth joint duct 22E. The fourth joint duct 22D takes the cooling air into the fourth battery module 3D, and the fifth joint duct 22E takes the cooling air into the fifth battery module 3E. The fourth joint duct 22D is located ahead of the fifth joint duct 22E.

A linking part 29 of the fourth joint duct 22D projects leftward from a left end portion of a main body part 28 of the fourth joint duct 22D, and a linking part 29 of the fifth joint duct 22E projects rearward from a center portion of a main body part 28 of the fifth joint duct 22E in the transversal direction.

Figure 7:
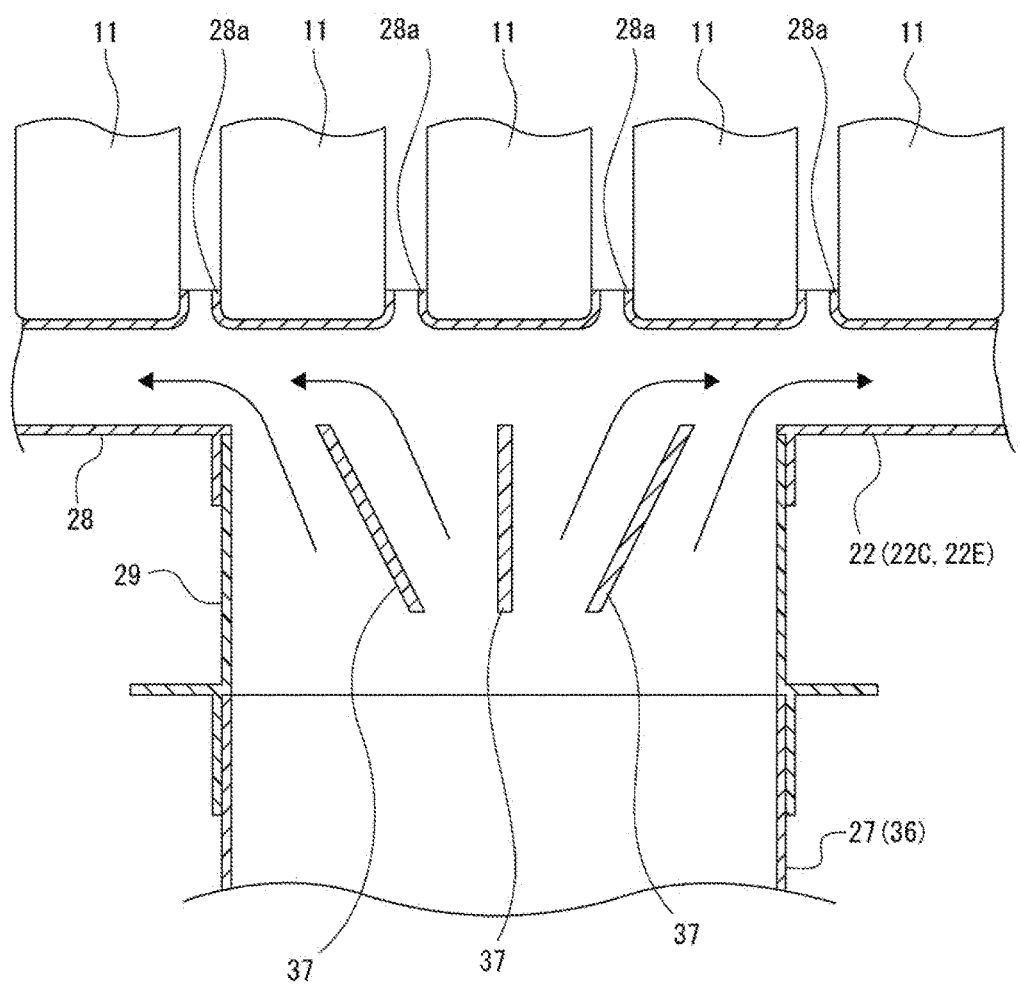
FIG. 7 is an enlarged cross-sectional view of a state in which rectification fins are disposed.

Three rectification fins 37 are disposed in each of the inside of the linking part 29 of the third joint duct 22C located rearmost of the first intake unit 17 and the inside of the linking part 29 of the fifth joint duct 22E located in the back of the second intake unit 18 (see FIG. 7). The rectification fins 37 are located in spaced relation with each other in the transversal direction. The rectification fin 37 located at the center faces the transversal direction, the left rectification fin 37 is located to have an inclination such that the front end thereof is more distanced from the center rectification fin 37, and the right rectification fin 37 is located to have an inclination such that the front end thereof is more distanced from the center rectification fin 37.

As illustrated in FIG. 1, the first intake unit 17 is disposed with respect to the housing case 2 such that the first intake fan 20 is located at the right of a rear end part of the housing case 2, and the intermediate part 24 of the first intake duct 19 is located to face the rear of the rear wall 7 of the housing case 2.

Figure 8:
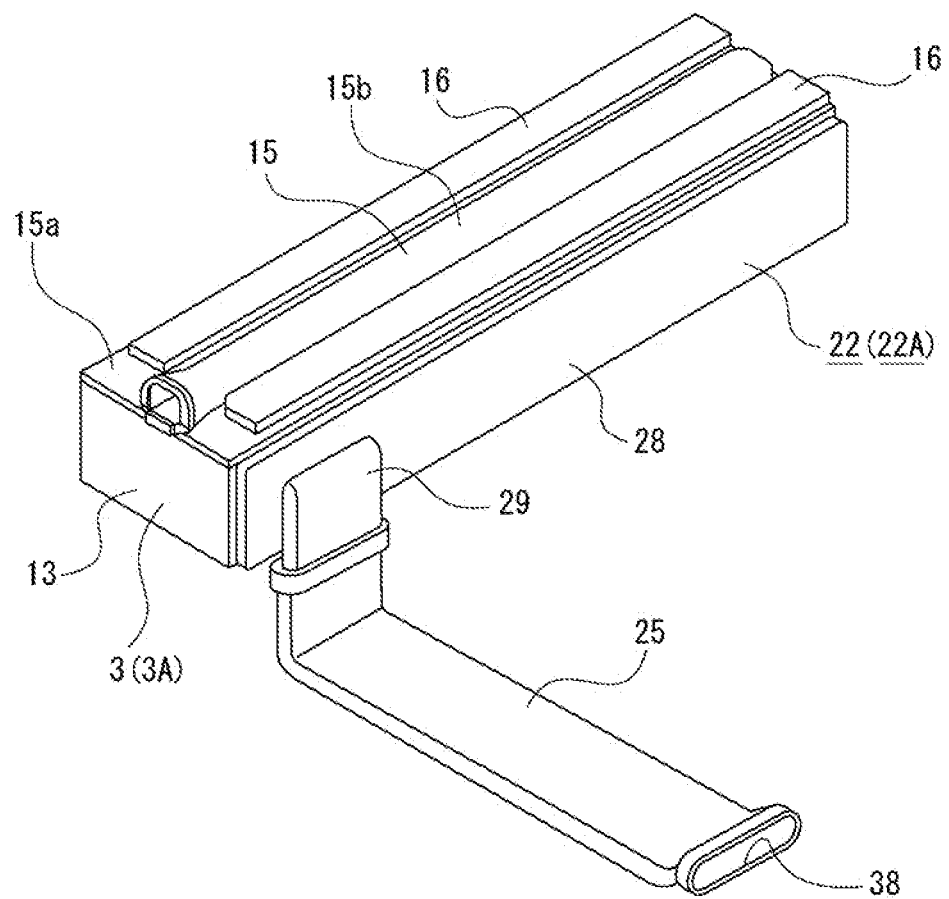
FIG. 8 illustrates battery modules and joint ducts together with FIGS. 9 to 12, and is a perspective view of a first battery module and a first joint duct.

In the state where the first intake unit 17 is disposed with respect to the housing case 2, the rear end portion of the first inflow part 25 penetrates through the rear wall 7, and the main body part 28 of the first joint duct 22A is located to face the rear surfaces of the battery cells 11 of the first battery module 3A (see FIG. 8). The first inflow part 25 is located below the second battery module 3B and the third battery module 3C inside the housing case 2.

The rear end portion of the first inflow part 25 is coupled to the rear wall 7 to project rearward from the rear wall 7 (see FIG. 2). The opening in the back of the first inflow part 25 serves as a first air intake hole 38 for taking the cooling air into the first battery module 3A.

Figure 9:
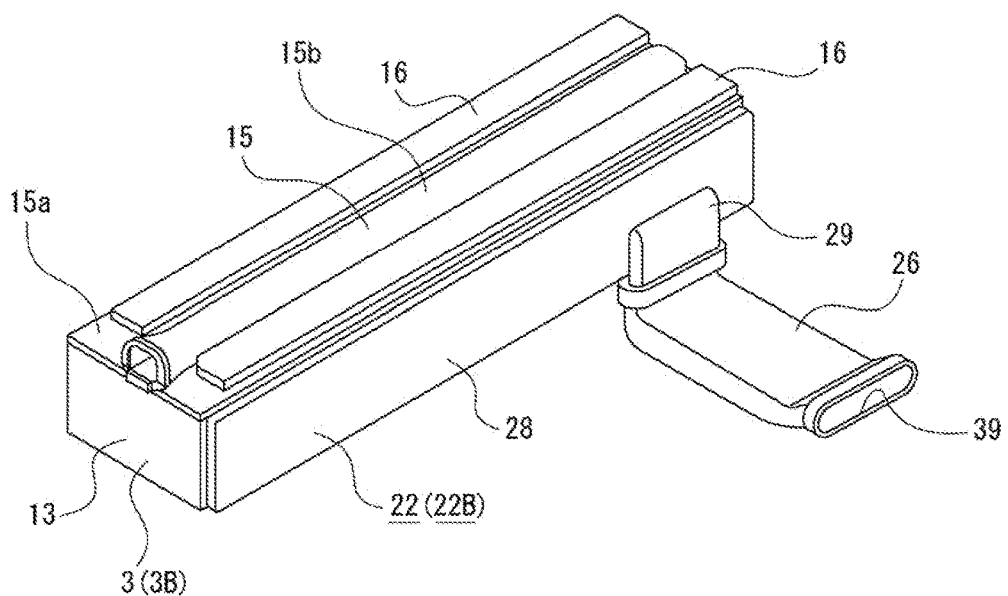
FIG. 9 is a perspective view of a second battery module and a second joint duct.

In the state where the first intake unit 17 is disposed with respect to the housing case 2, the rear end portion of the second inflow part 26 penetrates through the rear wall 7 (see FIG. 1), and the main body part 28 of the second joint duct 22B is located to face the rear surfaces of the battery cells 11 of the second battery module 3B (see FIG. 9). The second inflow part 26 is located below the third battery module 3C inside the housing case 2.

The rear end portion of the second inflow part 26 is coupled to the rear wall 7 to project rearward from the rear wall 7 (see FIG. 2). The opening in the back of the second inflow part 26 serves as a second air intake hole 39 for taking the cooling air into the second battery module 3B.

Figure 10:
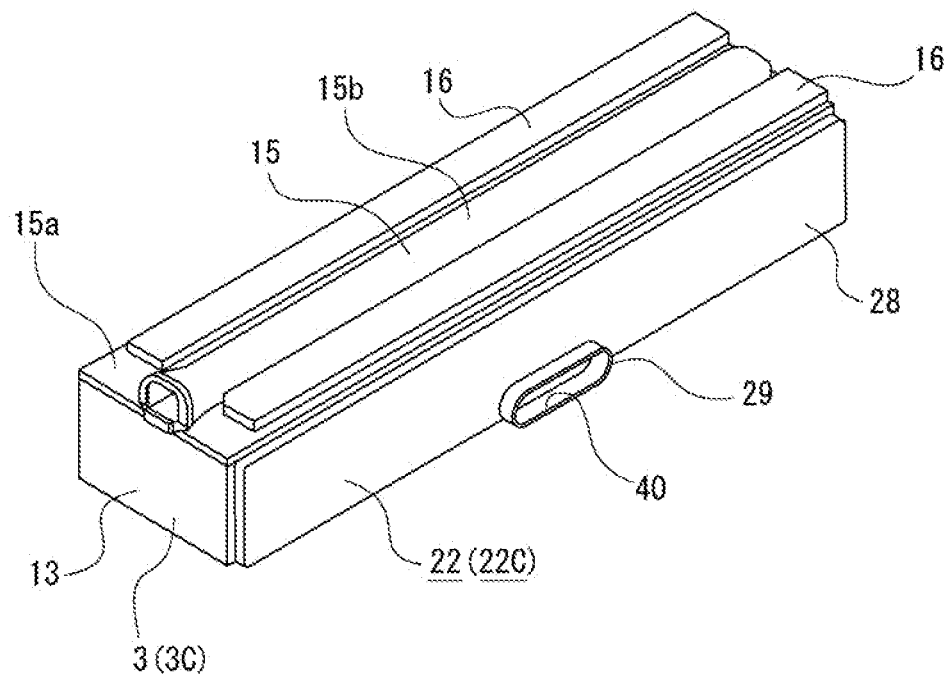
FIG. 10 is a perspective view of a third battery module and a third joint duct.

In the state where the first intake unit 17 is disposed with respect to the housing case 2, the third inflow part 27 penetrates through the rear wall 7 (see FIG. 1), and the main body part 28 of the third joint duct 22C is located to face the rear surfaces of the battery cells 11 of the third battery module 3C (see FIG. 10).

The third inflow part 27 is coupled to the rear wall 7 to project rearward from the rear wall 7 (see FIG. 2). The opening in the back of the third inflow part 27 serves as a third air intake hole 40 for taking the cooling air into the third battery module 3C.

As illustrated in FIG. 1, the second intake unit 18 is disposed with respect to the housing case 2 such that the second intake fan 31 is located on the left of the rear end part of the housing case 2, and the intermediate part 34 of the second intake duct 30 is located to face the rear of the rear wall 7 of the housing case 2. The intermediate part 34 is located above the intermediate part 24 of the first intake unit 17. Therefore, the intermediate part 24 and the intermediate part 34 do not overlap with each other in the longitudinal direction, resulting in downsizing of the onboard battery 1 in the longitudinal direction.

Figure 11:
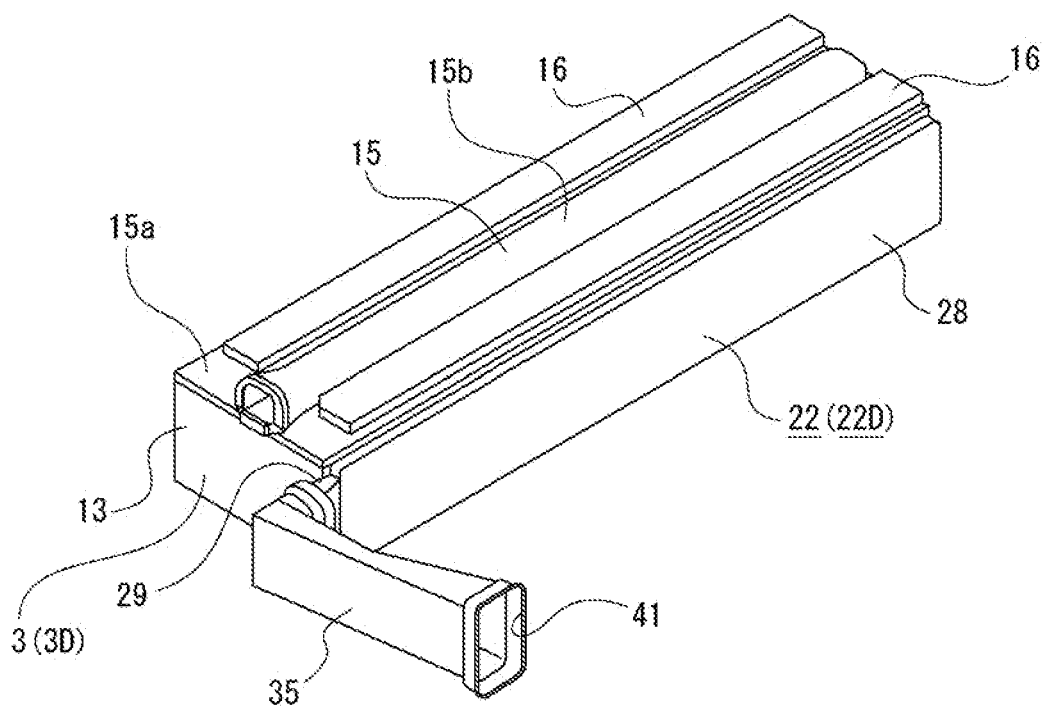
FIG. 11 is a perspective view of a fourth battery module and a fourth joint duct.

In the state where the second intake unit 18 is disposed with respect to the housing case 2, the rear end portion of the fourth inflow part 35 penetrates through the rear wall 7 (see FIG. 1), and the main body part 28 of the fourth joint duct 22D is located to face the rear surfaces of the battery cells 11 of the fourth battery module 3D (see FIG. 11). The fourth inflow part 35 is located on the left side of the fifth battery module 3E inside the housing case 2.

The rear end portion of the fourth inflow part 35 is coupled to the rear wall 7 to project rearward from the rear wall 7 (see FIG. 2). The opening in the back of the fourth inflow part 35 serves as a fourth air intake hole 41 for taking the cooling air into the fourth battery module 3D.

Figure 12:
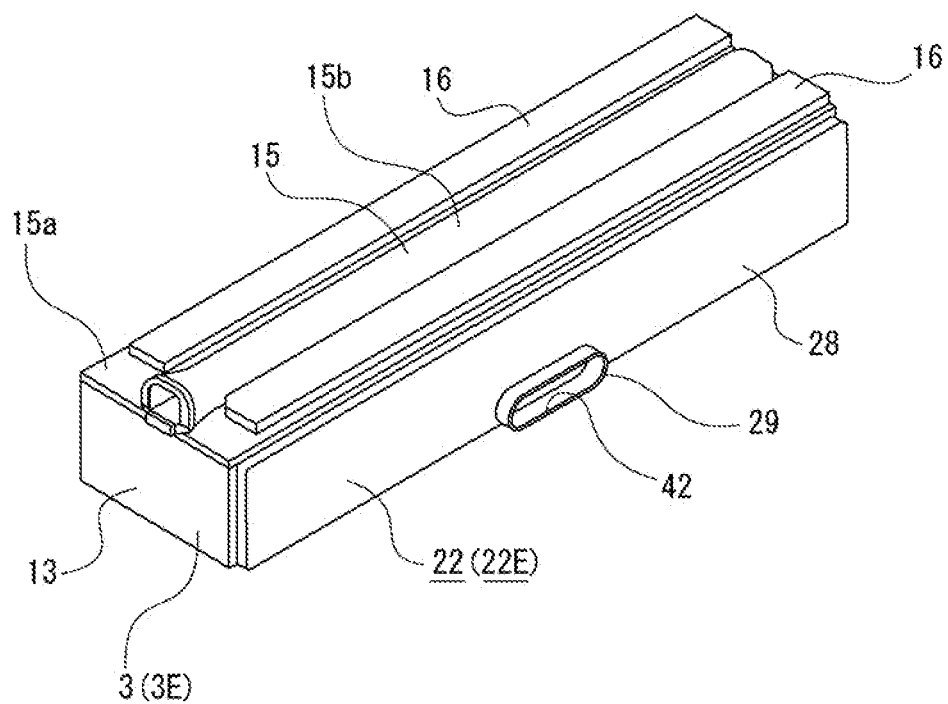
FIG. 12 is a perspective view of a fifth battery module and a fifth joint duct.

In the state where the second intake unit 18 is disposed with respect to the housing case 2, the fifth inflow part 36 penetrates through the rear wall 7 (see FIG. 1), and the main body part 28 of the fifth joint duct 22E is located to face the rear surfaces of the battery cells 11 of the fifth battery module 3E (see FIG. 12).

The fifth inflow part 36 is coupled to the rear wall 7 to project rearward from the rear wall 7 (see FIG. 2). The opening in the back of the fifth inflow part 36 serves as a fifth air intake hole 42 for taking the cooling air into the fifth battery module 3E.

As described above, the joint ducts 22 are located such that the respective main body parts 28 face the rear surfaces of the battery cells 11 (see FIGS. 8 to 12). Here, each of the discharging projections 28a of the main body part 28 is located between the battery cells 11 (see FIG. 7). Therefore, the cooling air discharged from each of the discharging projections 28a travels forward through spaces formed between the battery cells 11.

Now, a flow path of the cooling air will be described below.

When the first intake fan 20 and the second intake fan 31 rotate, air that is present outside the housing case 2 is taken from the first intake pipe 21 and the second intake pipe 32, respectively, into the first intake duct 19 and the second intake duct 30 as the cooling air.

The cooling air that has been taken into the first intake duct 19 flows from the intake part 23 to the intermediate part 24 to be split to the first inflow part 25, the second inflow part 26, and the third inflow part 27. The split cooling air flows toward the first joint duct 22A, the second joint duct 22B, and the third joint duct 22C to be discharged into the first battery module 3A, the second battery module 3B, and the third battery module 3C, respectively.

Because the linking part 29 of the third joint duct 22C located rearmost of the first intake unit 17 includes the rectification fins 37 therein, the rectification fins 37 cause pressure loss and the cooling air that has flowed to the intermediate part 24 easily flows also into the first inflow part 25 and the second inflow part 26.

The rectification fins 37 make it easier to cause the cooling air, which is introduced from a center portion of the third joint duct 22C in the transversal direction to flow to the left and right, and to discharge uniform cooling air into the third battery module 3C in the transversal direction.

The cooling air that is discharged into the first battery module 3A, the second battery module 3B, and the third battery module 3C travels forward through spaces between the battery cells 11, thereby cooling the battery cells 11. The cooling air that has traveled forward through the spaces between the battery cells 11 is ejected from the ejection hole 12a of the front surface part 12 to the internal space of the housing case 2.

On the other hand, the cooling air that has been taken into the second intake duct 30 flows from the intake part 33 to the intermediate part 34 to be split to the fourth inflow part 35 and the fifth inflow part 36. The split cooling air flows toward the fourth joint duct 22D and the fifth joint duct 22E to be discharged into the fourth battery module 3D and the fifth battery module 3E, respectively.

Because the linking part 29 of the fifth joint duct 22E located in the back of the second intake unit 18 includes the rectification fins 37 therein, the rectification fins 37 cause pressure loss and the cooling air that has flowed to the intermediate part 34 easily flows also into the fourth inflow part 35.

The rectification fins 37 make it easier to cause the cooling air, which is introduced from a center portion of the fifth joint duct 22E in the transversal direction to flow to the left and right, and to discharge uniform cooling air into the fifth battery module 3E in the transversal direction.

The cooling air that is discharged into the fourth battery module 3D and the fifth battery module 3E travels forward through the spaces between the battery cells 11, thereby cooling the battery cells 11. The cooling air that has traveled forward through spaces between the battery cells 11 is ejected from the ejection hole 12*a* of the front surface part 12 to the internal space of the housing case 2.

As described above, because the second battery module 3B is disposed between the first battery module 3A and the third battery module 3C and below the fourth battery module 3D, the temperature thereof is easy to increase. However, in the first intake unit 17, the length of the second inflow part 26 toward the second battery module 3B is shorter than the length of the first inflow part 25 toward the first battery module 3A.

Because a flowing distance of the cooling air flowing through the second inflow part 26 is short, the cooling air is less affected by the internal temperature of the housing case 2 or the like during flowing, thereby securing a high cooling performance of the battery cells 11 of the second battery module 3B.

A gas-exhaust duct 43 is disposed on the left of the battery modules 3 (see FIG. 2). The gas-exhaust duct 43 includes two linking parts 44 (only one of the linking parts 44 is illustrated) linked to the gas-exhaust pipes 15 disposed above the battery modules 3, a projecting part 45, and an exhaust part 46. The linking parts 44 are linked to each other in spaced relation with each other in the vertical direction, the projecting part 45 projects leftward from the one of the linking parts 44, and the exhaust part 46 is linked to the projecting part 45.

The linking parts 44 are disposed in the internal space of the housing case 2. The linking part 44 includes three coupling projections 44*a* that project rightward, and each of the coupling projections 44*a* is coupled to a left end portion of the corresponding one of the gas-exhaust pipes 15.

The projecting part 45 penetrates through the side wall 8 of the housing case 2.

The exhaust part 46 is disposed along the side wall 8 outside the side wall 8, and a tip thereof has an exhaust hole 46*a*.

In case of malfunction in the battery cells 11, gas flows from the gas-exhaust pipes 15 to the linking parts 44, the projecting part 45, and the exhaust part 46 in this order, and is discharged through the exhaust hole 46*a* to the outside of the housing case 2.

In the internal space of the housing case 2 are disposed a first junction box 47 and a second junction box 48 that each serve as a control device that controls the battery modules 3 (see FIG. 1). The first junction box 47 and the second junction box 48 are arranged side by side in the transversal direction, and located above the first battery module 3A in front of the fourth battery module 3D.

Each of the first junction box 47 and the second junction box 48 includes control components 49 that control current or the like. Examples of the control components 49 include relay, fuse, and connector terminals. The first junction box 47 and the second junction box 48 are connected to a power supply circuit (inverter) (not illustrated) installed in the underfloor of the vehicle via later-described conductive lines.

The cooling air that has been discharged from the joint ducts 22 and cooled the battery cells 11 of the battery modules 3 is introduced to the area in which the first junction box 47 and the second junction box 48 are disposed in the internal space of the housing case 2, and the cooling air cools the first junction box 47 and the second junction box 48.

In general, in terms of temperature management, it is desirable to set the temperatures of the battery modules 3 to 60° C. or less and to set the temperatures of the first junction box 47 and the second junction box 48 to 100° C. or less.

Accordingly, even if the first junction box 47 and the second junction box 48 are cooled by the cooling air that has an increased temperature by cooling the battery cells 11, a sufficient cooling performance using the cooling air for the first junction box 47 and the second junction box 48 is secured.

In a right end portion of the internal space of the housing case 2 are disposed an auxiliary device 50 and a control unit (not illustrated) arranged along the vertical direction. The auxiliary device 50 charges the vehicle in a non-running state of the vehicle, such as nighttime, and the control unit controls the entire onboard battery 1.

The cooling air that has cooled the battery cells 11 is also introduced to the area in which the auxiliary device 50 is disposed in the internal space of the housing case 2, thereby cooling the auxiliary device 50 and the control unit.

Figure 13:
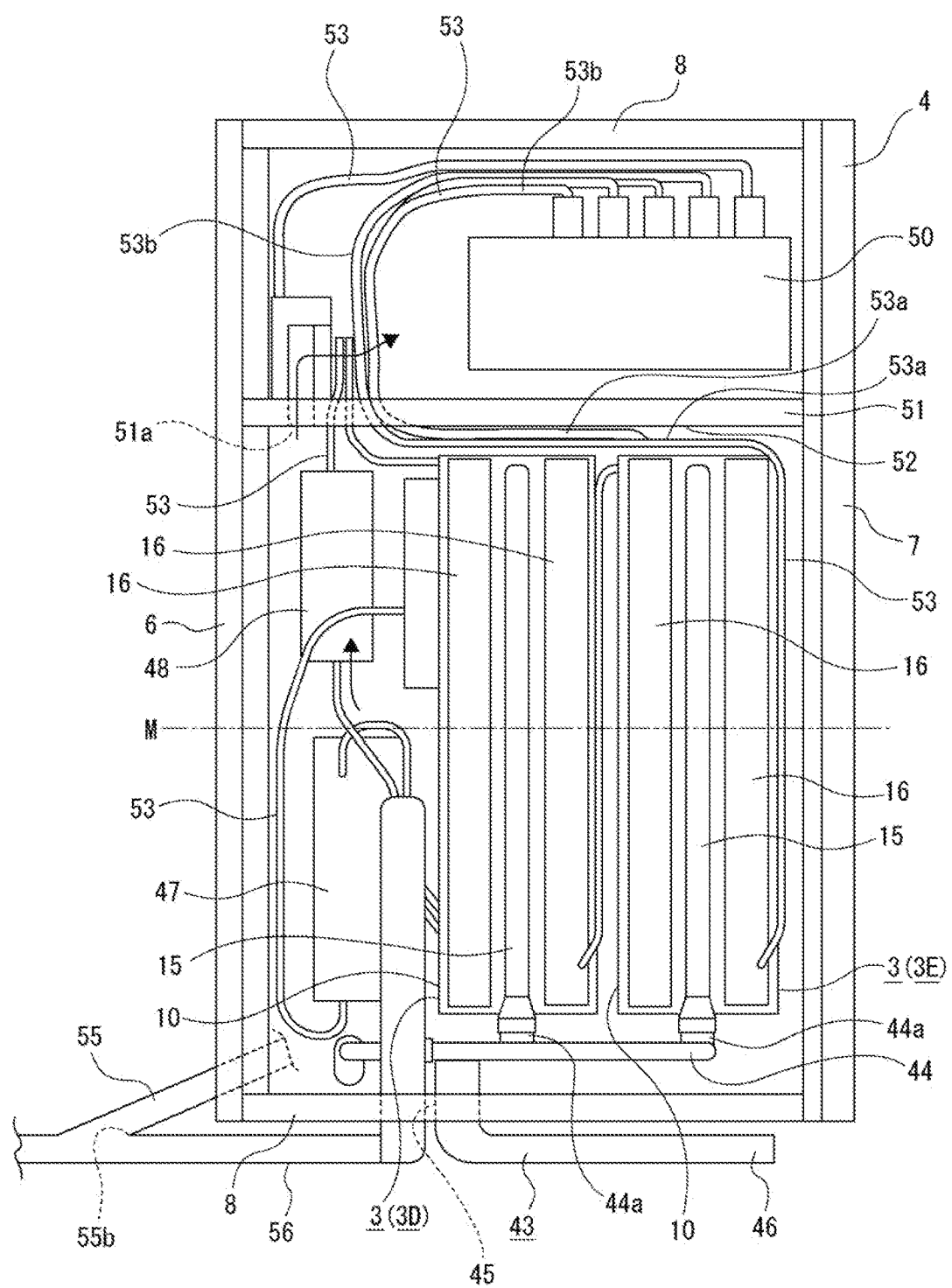
FIG. 13 is a schematic plan view of disposed positions of components.

Inside the housing case 2 is disposed a partition 51 between the battery modules 3 and the second junction box 48, and the auxiliary device 50 (see FIG. 13). The partition 51 is located in, for example, an almost upper half part of the internal space of the housing case 2, and a space is formed below the partition 51. The partition 51 has a communication hole 51*a* at a position close to the front end of the partition 51, the communication hole 51*a* penetrating through the partition 51 in the transversal direction. The communication hole 51*a* communicates with a space including the first junction box 47 and the second junction box 48 and a space including the auxiliary device 50.

The auxiliary device 50 is disposed at an end portion (a right end portion) in the transversal direction of the battery modules 3. A middle M of the transversal direction of the battery modules 3 is located to be shifted to either one of the left and the right (the left) of the center of the transversal direction of the vehicle.

In the housing case 2, the space between the partition 51 and the battery modules 3 and the space below the partition 51 serve as a conductor configuration space 52.

Inside the housing case 2 are disposed various conductors 53. The conductors 53 are used to connect the battery modules 3 with a control unit, to connect the battery modules 3 with each other, to connect the auxiliary device 50 with the battery modules 3, to connect the first junction box 47 with the second junction box 48, and to connect the first junction box 47 and the second junction box 48 with the battery modules 3, for example. A part of the conductors 53 may be inserted into the communication hole 51*a* of the partition 51.

Parts 53*a* of the conductors 53 are disposed collectively in the conductor configuration space 52, and other parts 53*b* of the conductors 53 are disposed around the auxiliary device 50.

Figure 14:
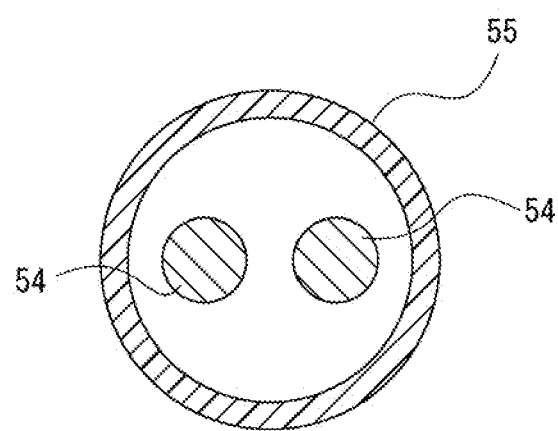
FIG. 14 is a cross-sectional view of a state where conductive lines are disposed in a protective pipe.

The first junction box 47 and the second junction box 48 are connected with a power supply circuit (inverter) (not illustrated) via two conductive lines 54, the power supply circuit being installed in the underfloor of the vehicle. The conductive lines 54 are disposed inside a protective pipe 55 and protected by the protective pipe 55 (see FIG. 14). The protective pipe 55, together with the conductive lines 54, is led to the outside of the housing case 2 from a left end portion of the housing case 2. An end portion of the protective pipe 55 is located near the first junction box 47 and the second junction box 48 inside the housing case 2, and the other end portion thereof is located near the power supply circuit outside the housing case 2.

Figure 15:
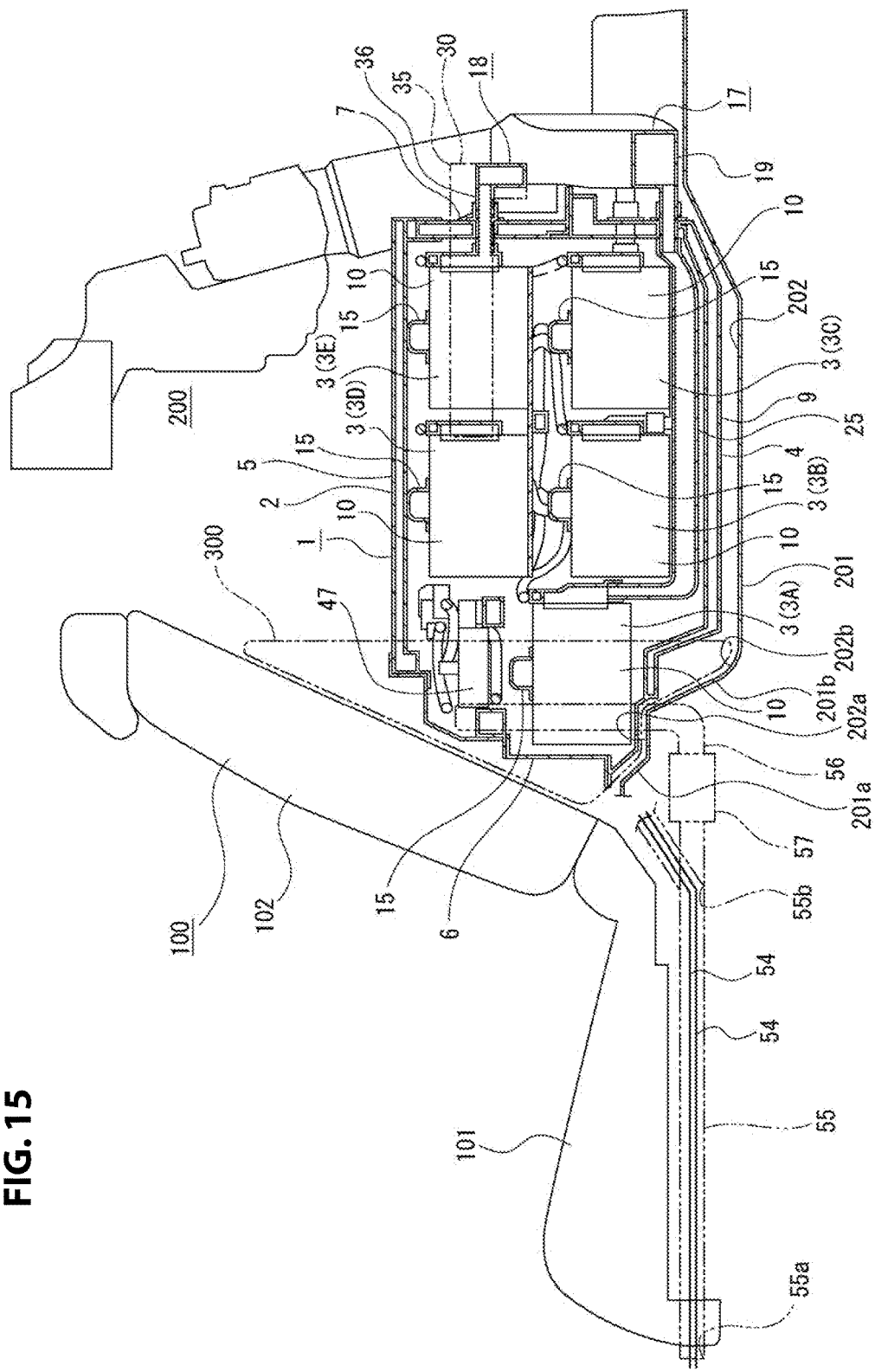
FIG. 15 is a schematic side view of a state of an onboard battery disposed in a vehicle, partially including a cross-sectional view.

The first junction box 47 and the second junction box 48 are connected with the power supply circuit (inverter) (not illustrated) installed in the underfloor of the vehicle via the conductive lines 54 (see FIG. 15). The conductive lines 54 are disposed inside the protective pipe 55 and protected by the protective pipe 55.

An end portion (rear end portion) of the protective pipe 55 is located below the first junction box 47 and the second junction box 48 inside the housing case 2, and the other end portion (front end portion) thereof is led from the housing case 2 to pass under a seat cushion 101 of a back seat 100 to be located near the power supply circuit.

An opening at the front of the protective pipe 55 serves as an air introducing port 55*a* for taking cooling air.

An intermediate part of the protective pipe 55 is linked to an end portion (rear end portion) of a front duct 56. A portion of the intermediate part of the protective pipe 55 linked to the front duct 56 is formed as a duct linking portion 55*b*.

Figure 16:
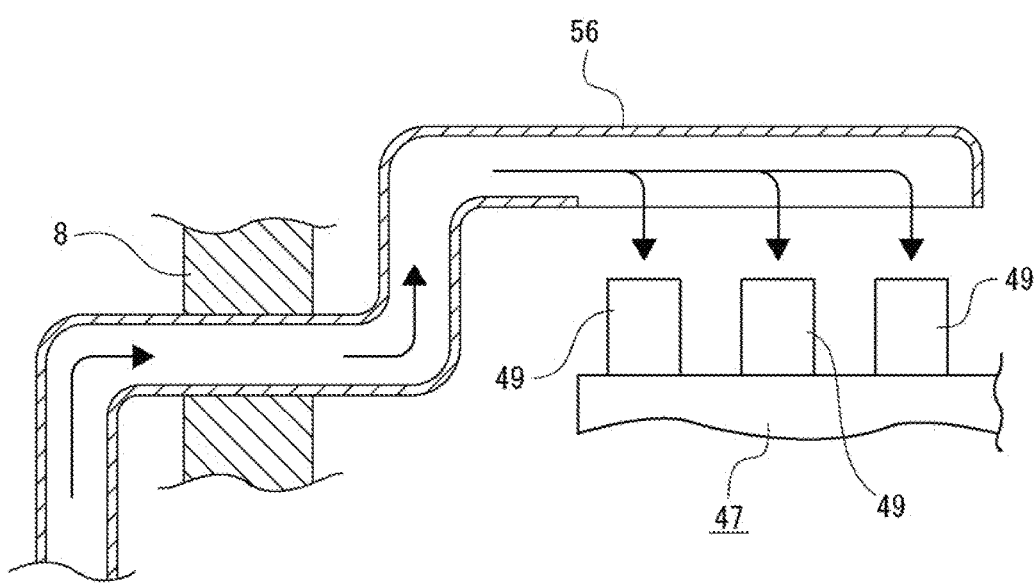
FIG. 16 is a schematic perspective view of a housing part of a housing case, a partition, and an auxiliary device.

A part of the front duct 56 is inserted into a side wall 8 of the housing case 2, and the other end portion thereof is located above the first junction box 47 in a front end portion inside the housing case 2 (see FIG. 16).

A front end portion of the front duct 56 may be located above the first junction box 47 and the second junction box 48.

A portion of the intermediate part of the front duct 56, the portion being outside the housing case 2, is linked to a cooling fan 57 (see FIG. 15). The cooling fan 57 takes outside air as cooling air into the housing case 2 through the protective pipe 55 and the front duct 56.

Thus, when the cooling fan 57 rotates, the cooling air is taken in from the air introducing port 55*a*, and the cooling air that has been taken in passes through the protective pipe 55 and the front duct 56 to be discharged from the above to an area of the internal space of the housing case 2 where the first junction box 47 is disposed, to cool the first junction box 47 and the second junction box 48. In this event, in the area where the first junction box 47 and the second junction box 48 are disposed in the internal space of the housing case 2, the cooling air that has been discharged from the joint ducts 22 and cooled the battery cells 11 is also introduced. The cooling air that has been discharged from the front duct 56, together with the cooling air that has cooled the battery cells 11, passes through the communication hole 51*a* of the partition 51 to be introduced into the space including the auxiliary device 50 (see FIG. 13).

In a case in which the partition 51 is located in the almost upper half part of the internal space of the housing case 2, even when the cooling air that has been discharged from the front duct 56 and the cooling air that has cooled the battery cells 11 pass through the space below the partition 51, such cooling air is introduced into the space including the auxiliary device 50.

Thus, convention is generated in the internal space of the housing case 2, thereby increasing the cooling performance of cooling the battery modules 3, the first junction box 47, and the second junction box 48.

The cooling air that has been introduced into the space including the auxiliary device 50 cools the auxiliary device 50 and the control unit, thereby suppressing an increase in the temperature of the auxiliary device 50 and the control unit.

In general, in terms of temperature management, it is desirable to set the temperature of the auxiliary device 50 to 80° C. or less, and to set the temperature of the control unit to 100° C. or less. Accordingly, even when the auxiliary device 50 and the control unit are cooled by the cooling air, the temperature of which is increased by cooling the first junction box 47 and the second junction box 48, the cooling air secures a sufficient cooling performance of cooling the auxiliary device 50 and the control unit.

In the onboard battery 1, an air-intake fan may be disposed in the space including the auxiliary device 50 or in part of the housing part 4 surrounding the space including the auxiliary device 50 so that convention can be generated inside the housing case 2 in the direction from the space including the first junction box 47 and the second junction box 48 toward the space including the auxiliary device 50.

The fan disposed as described above makes it easier to provide a negative pressure state of the space including the auxiliary device 50, to surely generate convention in the internal space of the housing case 2, and to secure a high cooling performance of cooling the auxiliary device 50 and the control unit.

In addition, it is possible to dispose the protective pipe 55 below the seat cushion 101, to take cooling air having a low temperature into the protective pipe 55, and to secure an even higher cooling performance of cooling the first junction box 47, the second junction box 48, the auxiliary device 50, and the control unit.

As described above, in the onboard battery 1, the middle M of the transversal direction of the battery modules 3 is located to be shifted to either one of the left and the right (the left) of the center of the transversal direction of the vehicle. Also, the auxiliary device 50 is located at the other end portion (the right end portion) in the transversal direction of the battery modules 3, the air intake holes 38, 39, 40, 41, and 42 are located in the back of a space between the left end and the right end of the battery modules 3, and the air introducing port 55*a* is formed, the air introducing port 55*a* taking the cooling air into the housing case 2 from the front of the left end portion, which is opposite to the space including the auxiliary device 50.

Therefore, the cooling air is taken from the rear side through the air intake holes 38, 39, 40, 41, and 42 to cool the battery cells 11, and also the cooling air is taken from the front side through the air introducing port 55*a* into the housing case 2 to cool the first junction box 47 and the second junction box 48. Thus, an increase in the internal temperature of the housing case 2 can be suppressed, and the cooling performance of cooling each component disposed inside the housing case 2 can be increased.

The conductive lines 54 connected with the first junction box 47 and the second junction box 48, which serve as control devices, are disposed by being inserted into the protective pipe 55, and the opening at one end of the protective pipe 55 is formed as the air introducing port 55*a*.

Therefore, the protective pipe 55 serves as a flowing port of the cooling air, and the cooling air is discharged toward the first junction box 47 and the second junction box 48. Thus, an increase in the temperatures of the first junction box 47 and the second junction box 48 can be suppressed.

Because the protective pipe 55 protecting the conductive lines 54 serves as the flowing port of the cooling air, there is no need to provide a dedicated flowing part for taking the cooling air from the front side into the housing case 2. Thus, it is possible to reduce the parts count and to increase the cooling performance of cooling the first junction box 47 and the second junction box 48.

In addition, the cooling air that has been taken in from the air intake holes 38, 39, 40, 41, and 42 is ejected into a front end portion inside the housing case 2, and the first junction box 47 and the second junction box 48 are disposed in the front end portion inside the housing case 2.

Accordingly, the cooling air discharged from the protective pipe 55 stirs the cooling air that has cooled the battery cells 11, thereby efficiently suppressing an increase in the internal temperature of the housing case 2.

In addition, inside the housing case 2, the partition 51 is provided to partition the battery modules 3, the first junction box 47, the second junction box 48, and the auxiliary device 50, and the partition 51 has the communication hole 51a that communicates with the space including the first junction box 47 and the second junction box 48 and the space including the auxiliary device 50.

Accordingly, the partition 51 makes it difficult for the battery modules 3 and the auxiliary device 50 to be mutually affected by heat generation of the battery modules 3 and the auxiliary device 50, and also makes the cooling air discharged from the protective pipe 55 be introduced through the communication hole 51a into the space including the auxiliary device 50, thereby suppressing an increase in the temperature of the auxiliary device 50.

Although the example of disposing five battery modules 3 has been described above, the number of the battery modules 3 disposed inside the housing case 2 is at least three. At least two battery modules 3 are disposed in the upper and lower stages, and one battery module 3 is disposed at the forefront.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. An onboard battery for a vehicle, comprising:
a plurality of battery modules comprising a first battery module, wherein the first battery module includes a case body and a plurality of battery cells disposed in the case body, and wherein the case body has an ejection hole;
a housing case that houses the plurality of battery modules;
a control device disposed adjacent to the ejection hole within the housing case, wherein the control device is configured to control the plurality of battery modules;
a first duct that extends from the housing case in order to take air from outside of the housing case into the housing case, wherein the first duct includes a discharge port that is disposed adjacent to the control device;
a first cooling fan configured to:
flow air through the first duct into the housing case, and
discharge air from the discharge port toward the control device;
a second duct that extends from the first battery module in order to take air from the outside of the housing case into the first battery module; and
a second cooling fan configured to:
flow air through the second duct into the first battery module, and
eject air from the ejection hole toward the control device; and
a conductive line connected to the control device, wherein the conductive line is in a protective pipe that is fluidly connected with the first duct,
wherein an opening at an end of the protective pipe is an air introducing port, and wherein the first cooling fan is further configured to take air from the air introducing port.

2. The onboard battery according to claim 1, wherein the housing case includes a partition, wherein the partition partitions a first space where the control device is disposed and a second space where an auxiliary device is disposed to charge the onboard battery, and
wherein the partition has a communication hole that communicates with the first space and the second space.

3. The onboard battery according to claim 1, further comprising an auxiliary device configured to charge the vehicle in a non-running state of the vehicle, wherein the vehicle is equipped with the onboard battery.

4. The onboard battery according to claim 1, further comprising a protective pipe fluidly connected with the first duct,
wherein an opening at an end of the protective pipe is an air introducing port,
wherein at least a part of the protective pipe is disposed under a seat within the vehicle, wherein the onboard battery is at a back of the seat of the vehicle, and
wherein the first cooling fan is further configured to flow air into the housing case through the protective pipe.

5. An onboard battery for a vehicle, comprising:
a plurality of battery modules comprising a first battery module, wherein the first battery module includes a case body and a plurality of battery cells disposed in the case body, and wherein the case body has an ejection hole;
a housing case that houses the plurality of battery modules;
a control device disposed adjacent to the ejection hole within the housing case, wherein the control device is configured to control the plurality of battery modules;
a second duct that extends from the first battery module in order to take air from the outside of the housing case into the first battery module; and
a second cooling fan configured to:
flow air through the second duct into the first battery module, and
eject air from the ejection hole toward the control device;
a first duct;
a protective pipe fluidly connected with the first duct,
wherein an opening at an end of the protective pipe is an air introducing port,
wherein at least a part of the protective pipe is disposed under a seat within the vehicle, and
wherein the onboard battery is at a back of the seat of the vehicle; and
a first cooling fan configured to flow air into the housing case through the protective pipe.

6. The onboard battery according to claim 5, wherein the housing case further includes a partition, wherein the partition partitions a first space where the control device is disposed and a second space where an auxiliary device is disposed to charge the onboard battery, and
wherein the partition has a communication hole that communicates with the first space and the second space.

7. The onboard battery according to claim 5, further comprising an auxiliary device configured to charge the vehicle in a non-running state of the vehicle, wherein the vehicle is equipped with the onboard battery.

* * * * *